(12) United States Patent
Buskgaard et al.

(10) Patent No.: US 9,781,612 B2
(45) Date of Patent: Oct. 3, 2017

(54) CORRELATION-BASED SELF-INTERFERENCE SUPPRESSION

(71) Applicant: Intel IP Corporation, Santa Clara, CA (US)

(72) Inventors: Emil Buskgaard, Aalborg (DK); Elpiniki Tsakalaki, Aalborg (DK); Osama Nafeth Alrabadi, Aalborg (DK); Mikael Bergholz Knudsen, Gistrup (DK); Gert Pedersen, Storvorde (DK); Alexandru Daniel Tatomirescu, Aalborg (DK); Poul Olesen, Stoevring (DK); Peter Bundgaard, Aalborg (DK); Pevand Bahramzy, Nørresundby (DK)

(73) Assignee: Intel IP Corporation, Santa Clara, CA (US)

( * ) Notice: Subject to any disclaimer, the term of this patent is extended or adjusted under 35 U.S.C. 154(b) by 176 days.

(21) Appl. No.: 14/231,679

(22) Filed: Mar. 31, 2014

(65) Prior Publication Data
US 2016/0373939 A1    Dec. 22, 2016

(51) Int. Cl.
*H04W 24/02*    (2009.01)
*H04B 1/525*    (2015.01)
(Continued)

(52) U.S. Cl.
CPC .......... *H04W 24/02* (2013.01); *H04B 1/525* (2013.01); *H04B 17/12* (2015.01); *H04W 72/0406* (2013.01); *H04W 72/082* (2013.01); *H04B 7/0617* (2013.01); *H04W 88/02* (2013.01); *H04W 88/08* (2013.01)

(58) Field of Classification Search
CPC ............. H04W 24/02; H04W 72/0406; H04W 72/082; H04W 88/02; H04W 88/08; H04B 1/525; H04B 17/12; H04B 7/0617
See application file for complete search history.

(56) References Cited

U.S. PATENT DOCUMENTS 7,139,592 B2 * 11/2006 Leifer ................. H01Q 3/2611
375/349
2003/0189518 A1 * 10/2003 Johnson ................ H01Q 1/245
343/702

(Continued)

FOREIGN PATENT DOCUMENTS

CN    104967461 A    10/2015
DE    102015002568 A1    10/2015
(Continued)

OTHER PUBLICATIONS

"Chinese Application Serial No. 201510090792.0, Office Action mailed Jan. 11, 2017", w/English Translation, 8 pgs.
(Continued)

*Primary Examiner* — Ajay Cattungal
(74) *Attorney, Agent, or Firm* — Schwegman Lundberg & Woessner, P.A.

(57) ABSTRACT

Representative implementations of devices and techniques provide self-interference suppression for a transceiver of a wireless communication system. To minimize interference from a transmit signal appearing on a receive path of the system, a cross-correlation is minimized between the transmit signal and a desired receive signal.

25 Claims, 5 Drawing Sheets

(51) Int. Cl.
  *H04B 17/12* (2015.01)
  *H04W 72/04* (2009.01)
  *H04W 72/08* (2009.01)
  H04B 7/06 (2006.01)
  H04W 88/02 (2009.01)
  H04W 88/08 (2009.01)

(56) References Cited

U.S. PATENT DOCUMENTS

| | | | |
|---|---|---|---|
| 2004/0151238 A1 | 8/2004 | Masenten | |
| 2008/0107093 A1* | 5/2008 | Meiyappan | H04B 1/525 370/339 |
| 2008/0225931 A1* | 9/2008 | Proctor | H04B 7/15542 375/214 |
| 2011/0243040 A1* | 10/2011 | Khan | H04B 7/0617 370/280 |
| 2012/0002586 A1* | 1/2012 | Gainey | H04B 1/525 370/315 |
| 2014/0036889 A1* | 2/2014 | Kim | H04L 1/1854 370/336 |
| 2014/0106688 A1* | 4/2014 | Negus | H04B 15/00 455/90.2 |
| 2015/0103745 A1* | 4/2015 | Negus | H04B 15/00 370/328 |

FOREIGN PATENT DOCUMENTS

| | | |
|---|---|---|
| TW | 200901692 A | 1/2009 |
| TW | I393399 B | 4/2013 |
| TW | 201547242 | 12/2015 |
| TW | I551089 B | 9/2016 |

OTHER PUBLICATIONS

"Germany Application Serial No. 102015002568.6, Office Action mailed Dec. 16, 2015", w/English Translation, 20 pgs.

"Taiwanese Application Serial No. 104105376, Office Action mailed Mar. 1, 2016", w/English Translation, 15 pgs.

"Taiwanese Application Serial No. 104105376, Response filed May 17, 2016 to Office Action mailed Mar. 1, 2016", w/English Claims, 17 pgs.

* cited by examiner (a)

(b)

(a)

(b)

US 9,781,612 B2

CORRELATION-BASED SELF-INTERFERENCE SUPPRESSION

BACKGROUND

In frequency-division duplexing (FDD) radio communication transceiver systems like UTRAN or CDMA-2000, as well as in full-duplexing systems, the radio transmitter (Tx) of the transceiver system can be active at the same time as the radio receiver (Rx). The Rx and the Tx can use separate dedicated frequency bands, as in FDD, or can share the same band, as in full-duplexing systems. The separation between the Rx and the Tx can be provided, for instance, by antenna filtering, RF filtering, baseband filtering, and/or the like.

In such systems, a portion of the transmitted signal may be captured by the receiver of the same transceiver. In some cases, this can be due to the transceiver having a single Tx/Rx antenna, using a sharp filter, or the like, to separate Tx from Rx. The "transmit leakage" from a Tx branch to a Rx branch can cause, for instance, the Tx signal to overload the Rx circuit and bring the Rx front-end into compression or even damage it. Moreover, Rx sensitivity can be degraded by the Tx noise in the Rx band. Consequently, it may be desirable to attenuate wide-band noise from the PA on the receiving channel to a sufficient level that the Tx noise contribution becomes small compared to the thermal noise on the Rx input.

Recent developments in radio frequency (RF) front-ends for handheld devices, for instance, include more flexible and tunable filtering. Spatial duplexing and active filters are offered for full duplex and FDD systems to isolate the Tx from the Rx. Generally, active filtering is performed by creating a cancelation path to the leakage path from the Tx to the Rx. For best results, the cancellation path has the same amplitude and opposite phase to the Tx leakage signal. However, because of the proximity effect of the user on the handheld devices and handset antennas, as well as other environmental factors, determining factory settings for such types of filters is problematic, since the Tx leakage signal can be dynamically changing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2($b$) is a vector illustration showing a two-point calibration for the approximation of the inverse of the gradient of the cross-correlation objective function via a finite difference estimate.

FIG. 3($b$) illustrates an example communication system applying an active filtering technique, including a single Tx antenna, according to another implementation.

DETAILED DESCRIPTION

Overview

Figure 1:
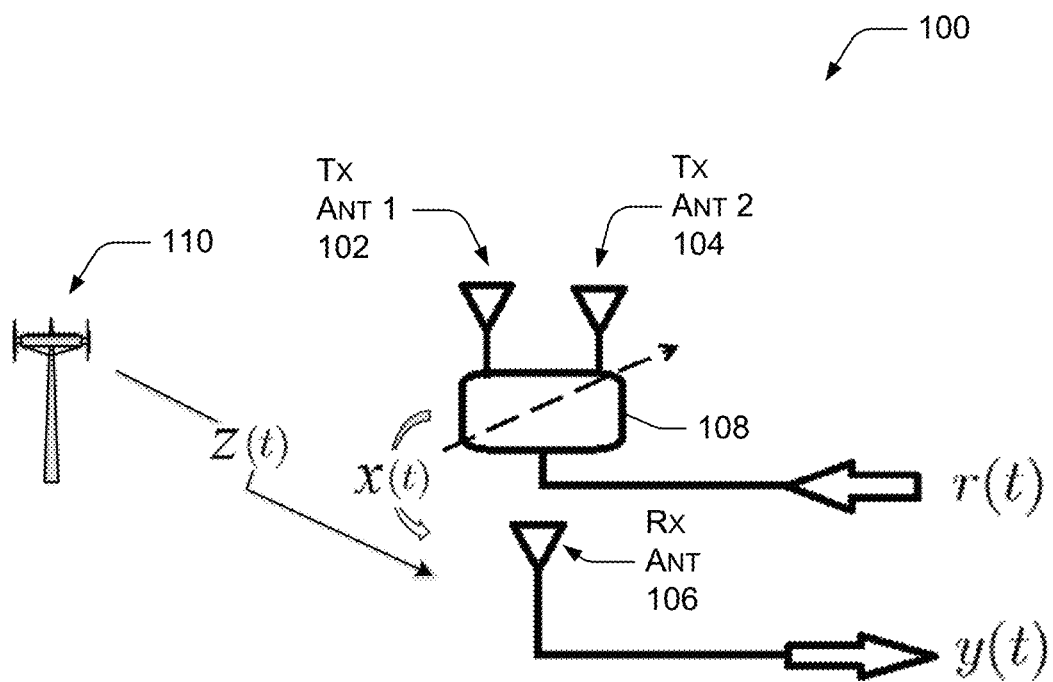
FIG. 1 is a block diagram of a portion of an example wireless communications system, in which the techniques in accordance with the present disclosure may be implemented.

A wireless transceiver system, such as a hand-held mobile device, for example, can experience receive path interference, comprising leakage transmit signals from transmit antenna(s) of the system, appearing on the receive path of the system. Representative implementations of devices and techniques provide self-interference suppression for a transceiver of such a wireless system. To minimize interference from a transmit signal appearing on a receive path of the system, a cross-correlation is minimized between the transmit signal and a desired receive signal. In various implementations, the techniques and devices described may be applied to each of multiple radio standards of the wireless system, providing interference reduction and/or cancellation for the receive path of each radio standard.

In an example, complex antenna weight(s) are added to a transmit signal of a transmit path to minimize the cross-correlation between the transmit signal and a desired receive signal of a receive path, thus minimizing the self-interference. In an implementation, the complex antenna weight(s) are determined based on one or more cross-correlation value(s) that can be produced from an iterative optimization technique.

In an implementation, dynamic tuning (e.g., occasional, periodic, or continuous tuning, etc.) is provided to ensure sufficient isolation between transmit and receive paths of the communication system (i.e., self-interference suppression). For example, the system may automatically determine that one or more of the cross-correlation values are out dated and update it accordingly. Further, the updating of cross-correlation values may be based on one or more user-defined or preset thresholds (e.g., maximum error thresholds, maximum correlation thresholds, or the like).

In one implementation according to a first aspect, an apparatus may include a filter component arranged to generate a complex antenna weight based on a cross-correlation value, to modify a magnitude and/or a phase of one or more transmit signals of a transceiver based on the complex antenna weight, and to suppress leakage of at least one of the one or more transmit signals to a receive path of the transceiver based on the modification.

In a further implementation of the first aspect, the cross-correlation value is based on a temporal cross-correlation between the one or more transmit signals and a received signal at the receive path.

In a further implementation of the first aspect, a control algorithm is arranged to control a generation and/or an adjustment of the complex antenna weight by the filter component, the temporal cross-correlation comprising an objective function to be minimized by the control algorithm.

In a further implementation of the first aspect, the filter component is arranged to calibrate the control algorithm by taking one or more error measurements based on an estimated complex antenna weight and to determine the cross-correlation value based on the error measurements, and to optimize the temporal cross-correlation by an iterative process using the cross-correlation value to determine an optimal complex antenna weight.

In a further implementation of the first aspect, the filter component is arranged to dynamically and continuously adjust the complex antenna weight based on a value of the cross-correlation between the one or more transmit signals and a received signal at the receive path exceeding a previous cross-correlation value and the cross-correlation value exceeding a preset threshold.

In one implementation according to a second aspect, a communication system may include a transmit path including one or more transmit antennas; a receive path including a receive antenna susceptible to leakage from the transmit path; a computational component arranged to determine a cross-correlation value based on a cross-correlation between one or more transmit signals of the transmit path and a desired receive signal for the receive path; and a filter component arranged to generate a complex weight value based on the cross-correlation value, to modify a magnitude and/or a phase of one or more of the transmit signals based on the complex weight value, and to suppress leakage of at least one of the one or more transmit signals to the receive path based on the modification.

In a further implementation of the second aspect, the system may include a balun component arranged to balance gains and phases of the one or more transmit antennas to generate and/or steer a null in a direction of the receive antenna.

In a further implementation of the second aspect, the filter component is further arranged to generate a cancellation signal via the complex weight value, the cancellation signal arranged to cancel the leakage from the transmit path.

In a further implementation of the second aspect, the cancellation signal comprises a signal having an equal magnitude and an opposite phase as the leakage from the transmit path.

In a further implementation of the second aspect, the filter component is further arranged to generate the cancellation signal by modifying a phase and/or a magnitude of one or more of the transmit signals.

In a further implementation of the second aspect, the filter component is further arranged to dynamically and continuously maintain the cancellation signal equal in magnitude and opposite in phase to the leakage from the transmit path.

In a further implementation of the second aspect, the filter component is further arranged to track the leakage from the transmit path and to dynamically and continuously adjust the complex weight value for maximum isolation between the transmit path and the receive path.

In a further implementation of the second aspect, the filter component is arranged to generate the cancellation signal via iterative steps proportional to a negative of an approximate gradient of a cross-correlation function at a current point.

In a further implementation of the second aspect, the filter component is arranged to approximate the gradient of the cross-correlation function with respect to the complex weight value via a finite difference quotient estimate.

In one implementation according to a third aspect, a method includes determining a cross-correlation value based on a cross-correlation between one or more transmit signals of a transceiver and a desired receive signal for the transceiver; generating a complex weight value based on the cross-correlation value; modifying a magnitude and/or a phase of one or more of the transmit signals based on the complex weight value; and suppressing leakage of at least one of the one or more transmit signals to a receive path of the transceiver based on the modifying.

In a further implementation of the third aspect, included is minimizing the cross-correlation between the one or more transmit signals and the desired receive signal via adjusting the complex weight value.

In a further implementation of the third aspect, included is generating the complex weight value via an iterative, gradient-based optimization algorithm arranged to converge to a minimum cross-correlation value within a threshold quantity of iterations.

In a further implementation of the third aspect, included is tuning a spatial filter or an active filter of the transceiver using the optimization algorithm.

In a further implementation of the third aspect, included is converging to the complex weight value using an objective function comprising the cross-correlation between the one or more transmit signals and the desired receive signal.

In a further implementation of the third aspect, included is dynamically tuning the complex weight value for maximum isolation between transmit antennas of the transceiver and a receive antenna of the receiver.

In a further implementation of the third aspect, included is monitoring the isolation between the transmit antennas and the receive antenna via monitoring the cross-correlation between the one or more transmit signals and the desired receive signal.

In a further implementation of the third aspect, included is comparing the cross-correlation to a past cross-correlation and to a threshold cross-correlation to determine whether to update the cross-correlation value.

In a further implementation of the third aspect, included is updating the cross-correlation value when the cross-correlation is greater than the past cross-correlation and the cross-correlation is greater than the threshold cross-correlation.

In a further implementation of the third aspect, included is suppressing leakage of a transmit signal of the transceiver based on a first radio standard to a receive path of the transceiver based on a second, different radio standard via generating a cancellation signal based on a minimum cross-correlation between the transmit signal of the first radio standard and a desired receive signal of the second radio standard.

In a further implementation of the third aspect, included is providing noise cancellation of a high frequency noise from an on-board source of the transceiver to a receive path of the transceiver via minimizing a cross-correlation between the high frequency noise and the receive path using an optimization algorithm based on an objective function comprising the cross-correlation between the high frequency noise and a desired receive signal of the receive path.

Various implementations, including techniques and devices, are discussed with reference to the figures. The disclosure illustrates the techniques and devices with reference to a wireless terminal device, such as a multi-antenna communication device. This is not intended to be limiting. The techniques and devices discussed may be applied to any of various communication device designs, circuits, and technologies, and remain within the scope of the disclosure. Further, the disclosure refers to a "filter device" or "filter component" in a general sense, to refer to active filters, spatial filters, and other filters, as well as baluns and other circuits and or devices for adjusting the magnitude and/or phase of a signal, particularly a transmit signal.

Advantages of the disclosed techniques and devices are varied, and include improved sensitivity of the Rx path(s) of a wireless system, improved longevity of components of the Rx path(s), and the like. Other advantages of the disclosed techniques may be apparent in the disclosure, based on the techniques and/or devices discussed.

Implementations are explained in more detail below using a plurality of examples. Although various implementations and examples are discussed here and below, further implementations and examples may be possible by combining the features and elements of individual implementations and examples.

Example Environment

FIG. 1 is a block diagram of a portion of an example wireless terminal system 100 ("system 100"), in which the techniques in accordance with the present disclosure may be implemented. As shown in FIG. 1, the system 100 may include two or more transmit antennas (102, 104). In various implementations, the system 100 may include one, three, or more transmit antennas (102, 104).

One or more of the transmit antennas (102, 104) may transmit a signal concurrently. For example, in the case of a frequency-division duplexing (FDD) system 100 or a full-duplexing system 100, as depicted in FIG. 1, a degree of isolation of the Rx from the Tx can be obtained by using at least two Tx antennas (102, 104) to steer a null in the direction of the Rx antenna 106 (or Rx path, for example). In such a system 100, the aim is to balance the gains and phase between the Tx antennas 102, 104 such that they form the null in the direction of the Rx antenna 106. An active antenna cancellation technique may include an adaptive balun 108, or the like, as shown in FIG. 1.

In such a system 100, the null formed by the two or more Tx antennas may not be exact, and so a small signal, x(t), can leak into the received signal y(t) via the receive antenna 106 (or receive path), along with the desired signal, z(t), from the serving base station 110. The total received signal can be expressed as:

$$y(t)=z(t)+x(t).$$

Figure 2:
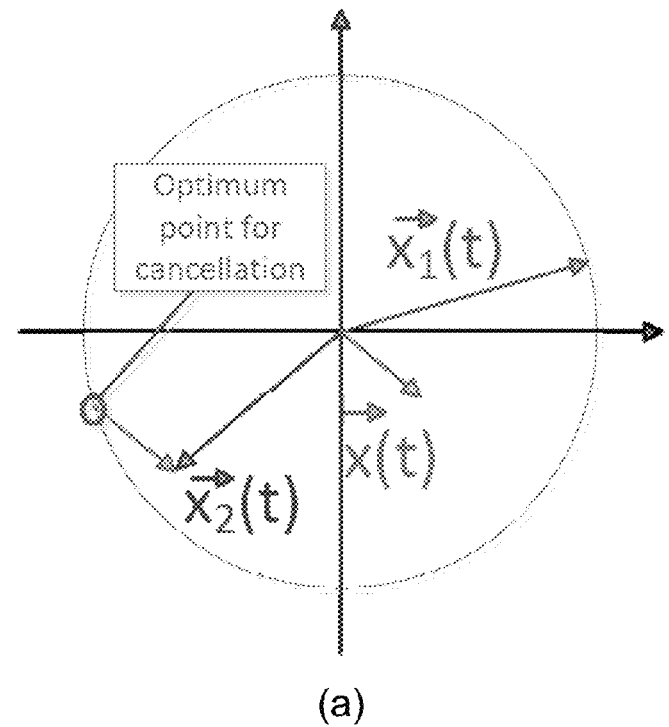
FIG. 2($a$) is a vector illustration showing the addition of two Tx signals, transmitted by two antennas, and a resulting interference signal. An optimum point for cancellation of the interference signal is also shown.
Figure 2:
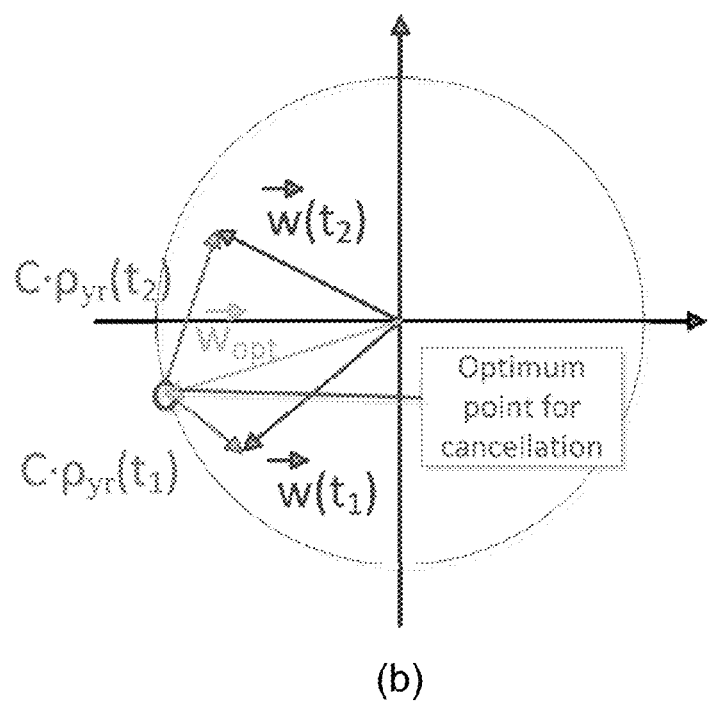

Accordingly, as described above or otherwise in a system 100, a portion of the transmitted signal, x(t), transmitted via one or more of the transmit antennas 102, 104 may be unintentionally captured by the receive antenna 106. The Tx leakage x(t) can be decomposed into separate components $x_1(t)$ and $x_2(t)$ from each Tx antenna 102 and 104 respectively, as seen in FIG. 2(a).

Referring to FIG. 2(a), assuming two Tx antennas (102, 104), the optimum point for cancellation implies that the optimum cancellation signal for the Tx antenna 104 comprises:

$$x_{2,opt}(t)=-x_1(t).$$

In other words, to suppress, avoid, or nullify the leakage signal x(t), the cancellation signal from Tx antenna 104, $x_{2,opt}(t)$, comprises a signal that is equal in magnitude and opposite in polarity (e.g., phase) to the signal transmitted by the Tx antenna 102 (e.g., $-x_1(t)$).

In an implementation, the formula for calculating x(t) is given by:

$$x(t)=x_1(t)+x_2(t)=h_1(t)\cdot r(t)+h_2(t)\cdot w(t)\cdot r(t),$$

where $h_1(t)$ and $h_2(t)$ are the channel responses from each of the Tx antennas (102, 104) to the Rx antenna 106, and w(t) is a complex weight applied on one or more Tx signal(s) to achieve the cancellation on the Rx antenna 106. The optimum cancellation signal, $x_{2,opt}(t)$, can be found when x(t)=0, i.e, when:

$$x_{2,opt}(t)=-x_1(t)=x_2(t)-x(t),$$

corresponding to the optimum antenna weight $w_{opt}(t)=-h1(t)/h2(t)$. Thus, one or more of the Tx branches can be weighted, via a complex weight w(t) (e.g., complex phase and/or magnitude multiplier, etc.), to isolate the Tx from the Rx. The complex weighting forms a cancellation signal that nullifies the leakage signal x(t) by modifying the phase and/or magnitude of the transmit signal(s).

A general issue when using active antenna or RF filtering is the challenge of keeping the cancellation signal equal in size and opposite in phase to the leakage signal x(t). For example, if the leakage signal x(t) is time-varying, it is desired for the cancellation signal to follow the variations in the leakage signal x(t) to maintain and/or maximize Rx to Tx isolation. To achieve this, a way of tracking the leakage signal x(t) dynamically is desired.

Example Implementation

In an implementation, the weighting of one or more of the Tx branches is controlled dynamically by a filter component, for example, via an optimization algorithm. In an example, a gradient-based optimization algorithm that converges to the minimum cross-correlation value, within a threshold number of iterations is used to dynamically control the Tx weighting. For instance, the optimization algorithm provides a control mechanism for tuning a spatial filter or any other type of active filter, antenna weighting, or the like, for quickly converging into the most optimal isolation possible between the Tx and the Rx. In the implementation, the optimization algorithm uses a defined objective function that is arranged to maximize the Tx-Rx isolation. In one implementation, the objective function comprises the cross-correlation between the Tx signal r(t) and the Rx signal y(t), as shown in FIG. 1.

As illustrated in FIG. 1, the Tx leakage x(t) is the part of the y(t) signal in the Rx branch that is correlated to the Tx signal. Therefore, a cross-correlation between the Tx signal r(t) and the Rx signal y(t) comprises an accurate indication of the Tx-Rx isolation. In an implementation, optimizing for minimum cross-correlation between r(t) and y(t) produces maximum Tx-Rx isolation.

In various examples, such a cross-correlation mechanism is transparent to the communication protocol used and converges even in the hardest disturbing environments. In the examples, the correlation-based objective function can be used for any system 100 where it is desired to suppress a known interferer in the Rx signal of interest, z(t), such as the system 100 of FIG. 1.

Since x(t) is a scaled version of r(t), it is strongly correlated with r(t). On the other hand, z(t) is uncorrelated with r(t). Accordingly, the smaller x(t) is, the weaker the cross-correlation between y(t) and r(t) will be. Therefore, in an implementation, the temporal cross-correlation between the two signals, y(t) and r(t), is used as an objective function to be minimized by a control (optimization) algorithm. The temporal cross-correlation as a function of y(t) and r(t) is given by:

$$\rho_{yr}=E[y(t)r(t)^*].$$

The cross-correlation can be used as an objective function by any adaptive filter, for example, where the goal is to obtain the best possible isolation between the local Rx and a Tx with a known signal. The isolation is calculated as the relationship between the amplitude of the Tx signal and the leakage signal x(t). The more powerful the Tx signal is compared to the signal from the base station z(t) the higher isolation can be achieved. This is a benefit, since this is the case where the isolation is needed the most.

Example Optimization

In an implementation, an efficient optimization technique is used by a filter component, for example, that converges to the optimum antenna weight, $w_{opt}$, minimizing the correlation-based objective function within a threshold number of iterations. In one example, the technique comprises a gradient-based optimization algorithm, where the minimum point is reached by taking steps proportional to the negative of the approximate gradient of the cross-correlation function at the current point. The gradient of the cross-correlation function (with respect to the complex antenna weight w(t)) can be approximated via a finite difference quotient estimate.

In an implementation, as shown in FIG. 2(b), the cross-correlation can be represented by a vector in the complex plane that corresponds to x(t). In the implementation, a complex scaling factor c(t) is determined, to relate the cross-correlation to the error in the weighting factor, $w_{err}(t)$, i.e., $$W_{err}(t) = c(t) \cdot \rho_{yr}(t).$$

In the implementation, c(t) is dependent on several factors, such as $h_1(t)$, $h_2(t)$, z(t) and r(t). As such, c(t) can be estimated by a two-point calibration: by doing two measurements (corresponding to time instants $t_1$ and $t_2$, based on there being two Tx antennas) and assuming that c(t) is constant for the duration of the calibration (c(t)=C). As shown in FIG. 2(b), two error vectors, $C \cdot \rho_{yr}(t_1)$ and $C \cdot \rho_{yr}(t_2)$, are obtained by this technique.

FIG. 2(b) is a vector illustration showing a two-point calibration (corresponding to time instants $t_1$ and $t_2$) for the approximation of the inverse of the gradient of the cross-correlation objective function, via a finite difference estimate. Since the two weights, $w(t_1)$ and $w(t_2)$, and the two error vectors, $C \cdot \rho_{yr}(t_1)$ and $C \cdot \rho_{yr}(t_2)$ are known, C can be calculated (via a processor, or the like) as follows:

$$w(t_1) = w_{opt}(t) + C \cdot \rho_{yr}(t_1) \text{ and } w(t_2) = w_{opt} + C \cdot \rho_{yr}(t_2)$$
$$w(t_1) - w(t_2) = C \cdot [\rho_{yr}(t_1) - \rho_{yr}(t_2)]$$
$$C = \frac{w(t_1) - w(t_2)}{\rho_{yr}(t_1) - \rho_{yr}(t_2)}$$

C is in essence the inverse of a (finite difference quotient) estimate of the gradient of the cross-correlation objective function with respect to the complex antenna weight w(t). Once C is known for the error vectors, $C \cdot \rho_{yr}(t_1)$ and $C \cdot \rho_{yr}(t_2)$, the weighting error, $w_{err}(t)$, is estimated based on the measured cross-correlation, and w(t) is adjusted accordingly. Thus, $w_{opt}(t)$ can be found as:

$$w_{opt}(t) = w(t) - C \cdot \rho_{yr}(t)$$

By continuously tracking $\rho_{yr}(t)$ and calculating $w_{opt}(t)$, it is possible to quickly find and subsequently adjust the weighting on one or more of the Tx antennas, such that maximum isolation between Rx and Tx is achieved. This is a form of dynamically tuning the system 100. Since the inverse gradient approximation C is not a constant, but is a function of several time-varying parameters (e.g., $h_1(t)$ and $h_2(t)$, it can be expected that the accuracy of the estimation may degrade with time and a new calibration and a run of the weighting algorithm be conducted. Accordingly, in various implementations, the isolation is monitored using varied techniques.

For example, in an implementation, the absolute cross-correlation value $|\rho_{yr}(t)|$ is periodically evaluated and compared to a previous value and/or a threshold value to determine when to recalibrate and rerun the weighting algorithm. In various implementations, the evaluation can be done in a guard space with reduced Tx power (to avoid a short duration of high BER), during normal operation of the communication system 100, or at other time intervals as desired. For example, the calibration can be made at full power by choosing the weights (e.g., $w(t_1)$ and $w(t_2)$) according to desired specifications. For example, the weights can be different enough to make the calibration robust against noise, but close enough to the optimum point so as not to result in a prohibitively high leakage x(t) for the Rx circuitry.

Example pseudocode of a control algorithm, according to one implementation, is provided below:

A. Initialization: Run a calibration to find an initial estimate of the optimum compensation vector:

A1. Set the weight to $w(t_1)$ and calculate $\rho_{yr}(t_1)$
A2. Set the weight to $w(t_2)$ and calculate $\rho_{yr}(t_2)$ A3. Calculate $C \leftarrow \dfrac{w(t_1) - w(t_2)}{\rho_{yr}(t_1) - \rho_{yr}(t_2)}$ B. Execution: Enter the main optimization loop:

B1. Set $w(t) \leftarrow w(t - 1) - C \cdot \rho_{yr}(t - 1)$
B2. Calculate $\rho_{yr}(t)$
B3. If $|\rho_{yr}(t)| > |\rho_{yr}(t - 1)|$ AND $|\rho_{yr}(t)| > \rho_{max}$ (where $\rho_{max}$ is the largest acceptable correlation)
then break and go to Step A
else continue from Step B In an implementation, as shown in the example pseudocode, the maximally allowed correlation $\rho_{max}$ is defined (e.g., user defined, preset, preselected, etc.), and as long as the correlation $\rho_{yr}(t)$ is decreasing, the "B. Execution" loop is allowed to run. In one example, when the correlation $\rho_{yr}(t)$ starts to reach its minimum, the weight, w(t) can be updated continually, however, slightly. At some point, C can become outdated and the correlation $\rho_{yr}(t)$ can start to increase. Once the correlation $\rho_{yr}(t)$ crosses the threshold, $\rho_{max}$, then Step B3 is true, and a new calibration is run, beginning with "A. Initialization."

In other words, the correlation $\rho_{yr}(t)$ is allowed to be higher than the threshold $\rho_{max}$ if it is still decreasing. Otherwise, the calibration is re-run and a new value of C is obtained. In an implementation, this allows the "B. Execution" loop to settle without retriggering the calibration. However, once the "B. Execution" loop is settled, then it is not acceptable for the correlation $\rho_{yr}(t)$ to increase above the defined threshold $\rho_{max}$.

In various implementations, the system 100 includes one or more processors (not shown), computational components, or the like, and memory storage components to implement the control algorithm (i.e., optimization algorithm), in conjunction with a filter component, for example, via the example pseudocode shown, or via similar instructions. In on example, the system 100 implements a controller that executes the control algorithm. The controller may be a hardware module, software or a combination of hardware and software. An example filter component can be selected based on the specifications of the application as well as the noise to be suppressed. For example, it can be desirable for the filtering to be wide enough to follow the changes in the channel responses, $h_1(t)$ and $h_2(t)$, but narrow enough to sufficiently limit the noise of the correlation.

In the implementations, the processor(s), in combination with a radio frequency front end (RFFE) and/or other transmission hardware components (e.g., filter devices or filter components, etc.) are arranged to adjust antenna weights, tune active filters, and so forth. This provides Tx to Rx isolation via the cross-correlation minimization operation arranged to reduce the correlation between the transmission signal r(t) and the receive signal y(t). In an ideal case, when r(t) and y(t) are completely uncorrelated, the contribution from the transmission leakage signal x(t) may be completely suppressed. Due to the correlation operation, the transmission signal and the desired receive signal z(t) can have a weak correlation, and the effect of the transmission leakage signal x(t) is suppressed. This can result in the receive signal being less corrupted and more accurate.

Additional Implementations

Figure 3:
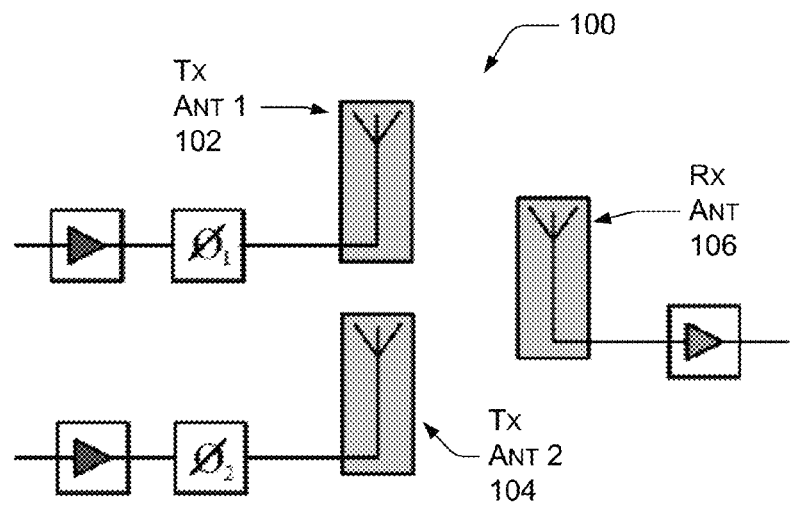
FIG. 3($a$) illustrates an example communication system applying a spatial duplexing technique, including multiple Tx antennas, according to one implementation.
Figure 3:
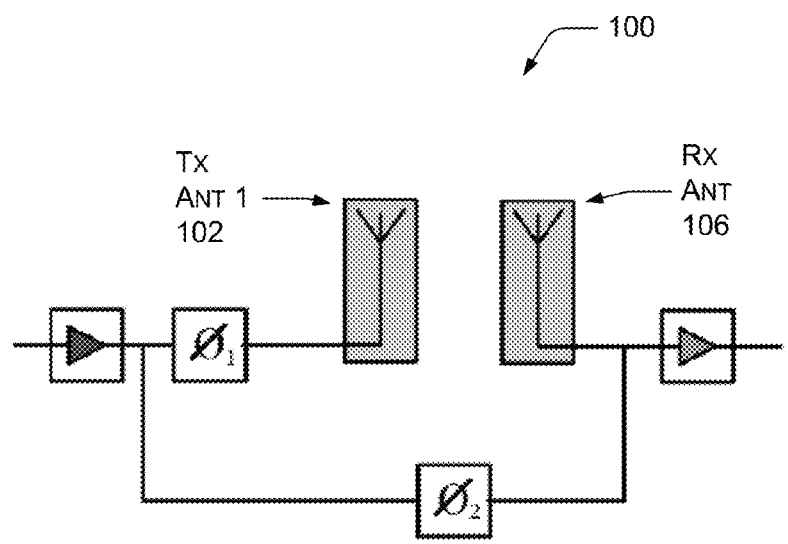

It should be noted that the system 100 and the techniques are described generally, and need not be limited to the spatial duplexing technique where multiple weighted Tx antennas 102, 104 null the Tx signal in the Rx direction (FIG. 3(a)). In other implementations, the correlation-based system 100 can also be equipped with a single Tx antenna 102 and active filters ϕ1 and ϕ2, in an alternate arrangement, as shown in FIG. 3(b). In such an arrangement, the active filters ϕ1 and ϕ2 can be used to control the delay and attenuation of the Tx cancellation branch, which is fed into the Rx branch to cancel the Tx signal that is received by the Rx (power cancellation duplexing methods), as shown in FIG. 3(b).

Further implementations may include multiple-input multiple-output (MIMO) arrangements of a system 100, which have two or more receive paths (or Rx antennas), as well as multiple transmit paths (or Tx antennas). Such implementations can include at least one compensation path per receive path (or RX antenna) to utilize the self-interference devices and techniques described. In the implementations, each compensation path contains a superposition of all Tx signals in the system 100, while each Tx signal has an associated individual weighting, as described above.

For example, a system 100 having 2 Tx antennas and 4 Rx antennas includes 4 compensation paths (which could be antennas as illustrated in FIG. 3(a) or could be traces as shown in FIG. 3(b), for example). Each compensation path has two Tx signals added, for example, based on the signals of the two Tx antennas. A correlation is made with each of the two Tx signals, and the weighting of each Tx signal is regularly updated, as described above. Additionally, calibration is also performed as desired, with respect to both Tx signals.

In other implementations, other arrangements of a system 100 can also utilize the self-interference devices and techniques described. For example, the cross-correlation function can also be used for optimizing interferer cancellation between different radio standards in the communication system 100 (e.g., cellular, WIFI, Bluetooth™, etc.). In a mobile device, for instance, if a WIFI transmitter has a cancellation path to a Bluetooth™ receiver, the WIFI transmitter can be cross-correlated with the received Bluetooth™ signal, and the cancellation signal can be optimized for minimum cross correlation, maximizing isolation as described above.

In other implementations, applications of the cross-correlation technique in a system 100 can include noise cancellation for other high frequency noise sources such as clocks or high-speed digital busses, and the like. If the aggressor (self-interference) signal is generated on-board and a leakage cancellation path is built to the wanted Rx signal then the cross-correlation function can be used to optimize the cancellation by minimizing the correlation between the wanted Rx signal and the self-interference signal.

Figure 4:
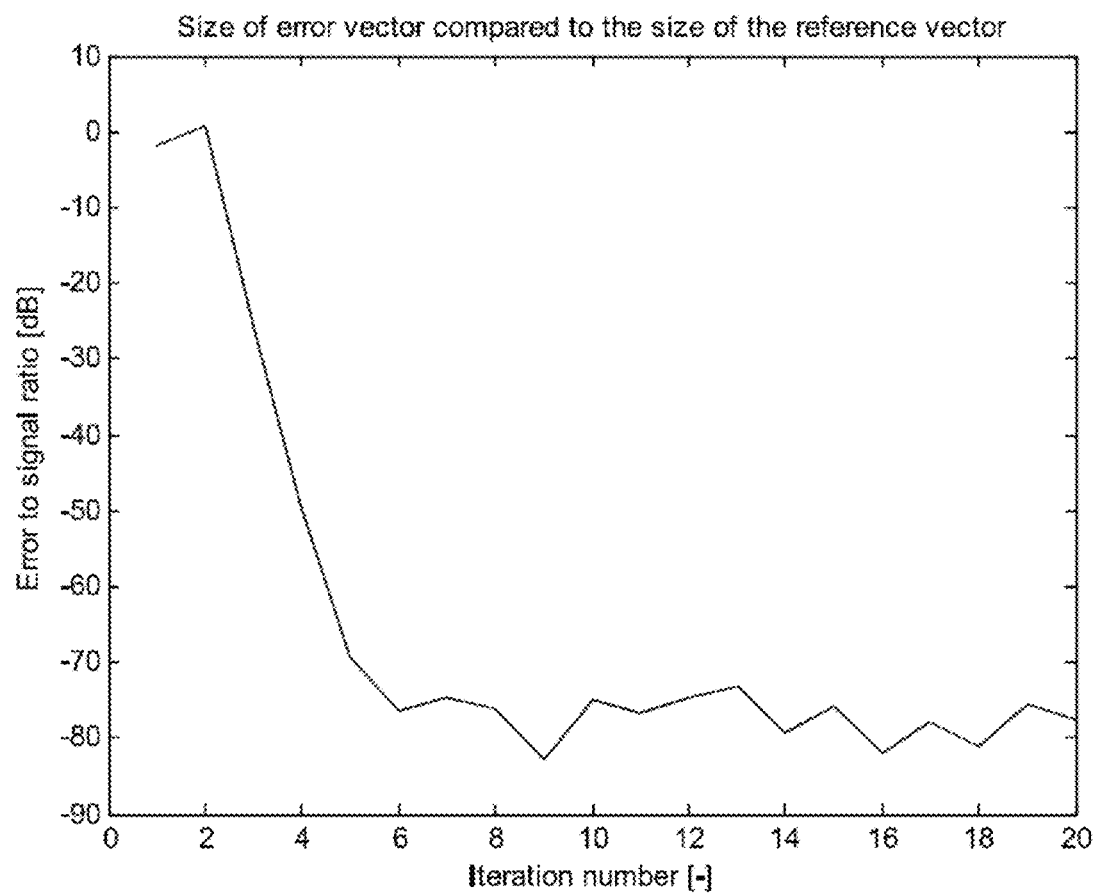
FIG. 4 is a graph showing a reduction in the error to signal ratio (in dB) for a communication system, which illustrates the Tx to Rx isolation of the system, based on a quantity of correlation iterations.

FIG. 4 is a graph showing a reduction in the error to signal ratio (in dB) for a communication system 100. The graph illustrates the Tx to Rx isolation of the system, based on a quantity of correlation iterations, performed as described with the pseudocode above, including the "A. Initialization" and "B. Execution" loops. For example, the "A. Initialization" sequence includes a two-point (e.g., two time instances $t_1$ and $t_2$) calibration as described above. After calibration, the "B. Execution" loop is entered, as also detailed above.

The results based on this implementation are seen in FIG. 4. Specifically, the "B. Execution" loop of the algorithm achieves almost full isolation after 5 iterations. It is noted that the first two iterations corresponding to the calibration phase ("A. Initialization") may not necessarily give good isolation, as they are intended to calibrate the control algorithm. Accordingly, the third iteration may be considered to be the first effective optimization step. As shown in the graph of FIG. 4, the algorithm converges within 5 total iterations to an isolation level higher than 70 dB.

It is to be understood that a system 100 may be implemented as a separate component or as part of another system including a communication device, for example. The techniques and devices described herein with respect to a system 100 is not limited to the configurations shown in FIGS. 1 and 3, and may be applied to other configurations without departing from the scope of the disclosure. Various implementations of a system 100 as described herein may include fewer components and remain within the scope of the disclosure. Alternately, other implementations of a system 100 may include additional components, or various combinations of the described components, and remain within the scope of the disclosure.

Representative Process

Figure 5:
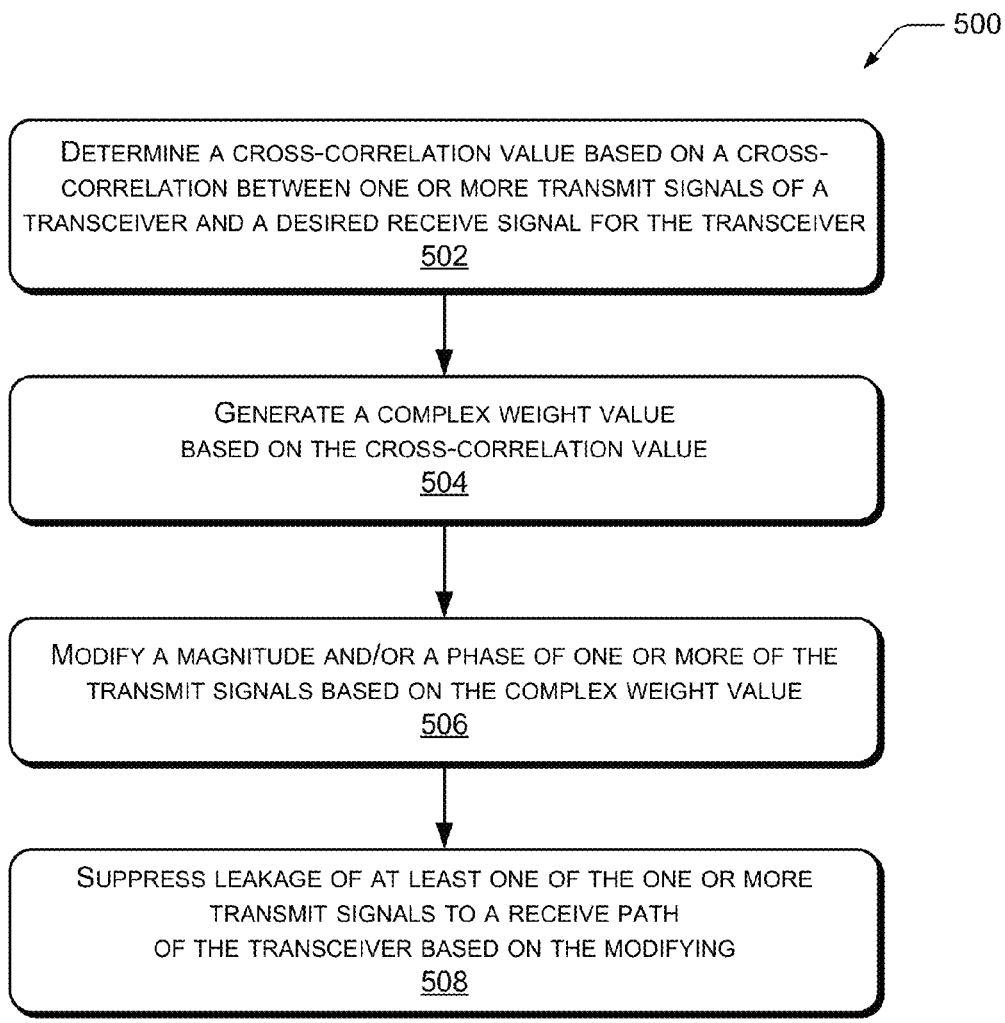
FIG. 5 is a flow diagram illustrating an example process of suppressing self-interference, according to an implementation.

FIG. 5 illustrates a representative process 500 of suppressing self-interference in a wireless communication system (such as system 100, for example) with one or more Tx antennas, according to an implementation. The process 500 includes reducing a correlation between a transmit signal and a desired receive signal of the system. In an implementation, the correlation is reduced by applying one or more antenna weights based on a control algorithm (i.e., optimization algorithm). The process 500 is described with reference to FIGS. 1-4.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 502, the process includes determining a cross-correlation value based on a cross-correlation between one or more transmit signals of a transceiver and a desired receive signal for the transceiver.

At block 504, the process includes generating a complex weight value based on the cross-correlation value. In an implementation, the process includes generating the complex weight value via an iterative, gradient-based optimization algorithm arranged to converge to a minimum cross-correlation value within a threshold quantity of iterations.

In an implementation, the process includes tuning a filter component, such as a spatial filter or an active filter of the transceiver using the optimization algorithm. For example, the process includes converging to the complex weight value using an objective function comprising the cross-correlation between the one or more transmit signals and the desired receive signal. This can also include dynamically tuning the complex weight value for maximum isolation between transmit antennas of the transceiver and a receive antenna of the receiver.

At block 506, the process includes modifying a magnitude and/or a phase of one or more of the transmit signals based on the complex weight value. At block 508, the process includes suppressing leakage of at least one of the one or more transmit signals to a receive path of the transceiver based on the modifying.

In an implementation, the process includes minimizing the cross-correlation between the one or more transmit signals and the desired receive signal via adjusting the complex weight value. In various implementations, the weaker the correlation between the one or more transmit signals and the desired receive signal, the better the isolation between the transmit path and the receive path, and thus, better accuracy in the receive path. In an ideal case, there is no correlation between the one or more transmit signals and the desired receive signal, and the power of the interference signal is suppressed from the receive path.

In an implementation, the process includes monitoring the isolation between the transmit antennas and the receive antenna via monitoring the cross-correlation between the one or more transmit signals and the desired receive signal. For example, the process includes comparing the cross-correlation to a past cross-correlation and to a threshold cross-correlation to determine whether to update the cross-correlation value. This can also include updating the cross-correlation value when the cross-correlation is greater than the past cross-correlation and the cross-correlation is greater than the threshold cross-correlation, for example.

In an implementation, the process includes suppressing leakage of a transmit signal of the transceiver based on a first radio standard to a receive path of the transceiver based on a second, different radio standard via generating a cancellation signal based on a minimum cross-correlation between the transmit signal of the first radio standard and a desired receive signal of the second radio standard.

In an additional implementation, the process includes suppressing the noise of a known signal, such as providing noise cancellation of a high frequency noise from an onboard source of the transceiver to a receive path of the transceiver. For example, the suppression can be provided via minimizing a cross-correlation between the high frequency noise and the receive path using an optimization algorithm based on an objective function comprising the cross-correlation between the high frequency noise and a desired receive signal of the receive path. In such an implementation, at least a part of the noisy signal is to be known, to be used for the correlation. For example, Tx noise can be minimized by the process when the cancellation is performed in the RFFE (or the like) so that the noise part of the Tx and compensation branches is correlated, as well as the known signal.

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. An apparatus, comprising:
a filter component arranged to generate a complex antenna weight based on a cross-correlation value, the cross-correlation value based on a cross-correlation between one or more transmit signals of a transmit path of a transceiver and at least one receive signal of a receive path of the transceiver, the at least one receive signal comprising either a desired receive signal for the receive path or a received signal at the receive path, to modify a magnitude or a phase of the one or more transmit signals of the transceiver based on the complex antenna weight, and to suppress leakage of at least one of the one or more transmit signals to the receive path of the transceiver based on the modification.

2. The apparatus of claim 1, wherein the cross-correlation value is based on a temporal cross-correlation between the one or more transmit signals and the received signal at the receive path.

3. The apparatus of claim 2, further comprising a controller arranged to control a generation or an adjustment of the complex antenna weight by the filter component, the temporal cross-correlation comprising an objective function to be minimized by the controller.

4. The apparatus of claim 3, wherein the filter component is arranged to calibrate the controller by taking one or more error measurements based on an estimated complex antenna weight and to determine the cross-correlation value based on the error measurements, and to optimize the temporal cross-correlation by an iterative process using the cross-correlation value to determine an optimal complex antenna weight.

5. The apparatus of claim 1, wherein the filter component is arranged to dynamically and continuously adjust the complex antenna weight based on a value of the cross-correlation between the one or more transmit signals and the received signal at the receive path exceeding a previous cross-correlation value and the cross-correlation value exceeding a preset threshold.

6. A communication system, comprising:
a transmit path of a transceiver, the transmit path including one or more transmit antennas;
a receive path of the transceiver, the receive path including a receive antenna susceptible to leakage from the transmit path;
a computational component arranged to determine a cross-correlation value based on a cross-correlation between one or more transmit signals of the transmit path and a desired receive signal for the receive path; and
a filter component arranged to generate a complex weight value based on the cross-correlation value, to modify a magnitude ora phase of one or more of the transmit signals based on the complex weight value, and to suppress leakage of at least one of the one or more transmit signals to the receive path based on the modification.

7. The system of claim 6, further comprising a balun component arranged to balance gains and phases of the one or more transmit antennas to generate or steer a null in a direction of the receive antenna.

8. The system of claim 6, wherein the filter component is further arranged to generate a cancellation signal via the complex weight value, the cancellation signal arranged to cancel the leakage from the transmit path.

9. The system of claim 8, wherein the cancellation signal comprises a signal having an equal magnitude and an opposite phase as the leakage from the transmit path.

10. The system of claim 8, wherein the filter component is further arranged to generate the cancellation signal by modifying a phase or a magnitude of one or more of the transmit signals.

11. The system of claim 8, wherein the filter component is further arranged to dynamically and continuously maintain the cancellation signal equal in magnitude and opposite in phase to the leakage from the transmit path.

12. The system of claim 11, wherein the filter component is further arranged to track the leakage from the transmit path and to dynamically and continuously adjust the complex weight value for maximum isolation between the transmit path and the receive path.

13. The system of claim 8, wherein the filter component is arranged to generate the cancellation signal via iterative steps proportional to a negative of an approximate gradient of a cross-correlation function at a current point.

14. The system of claim 13, wherein the filter component is arranged to approximate the gradient of the cross-correlation function with respect to the complex weight value via a finite difference quotient estimate.

15. A method, comprising:
determining a cross-correlation value based on a cross-correlation between one or more transmit signals of a transceiver and a desired receive signal for the transceiver;
generating a complex weight value based on the cross-correlation value;
modifying a magnitude or a phase of one or more of the transmit signals based on the complex weight value; and
suppressing leakage of at least one of the one or more transmit signals to a receive path of the transceiver based on the modifying.

16. The method of claim 15, further comprising minimizing the cross-correlation between the one or more transmit signals and the desired receive signal via adjusting the complex weight value.

17. The method of claim 15, further comprising generating the complex weight value via an iterative, gradient-based optimization process arranged to converge to a minimum cross-correlation value within a threshold quantity of iterations.

18. The method of claim 17, further comprising tuning a spatial filter or an active filter of the transceiver using the optimization process.

19. The method of claim 17, further comprising converging to the complex weight value using an objective function comprising the cross-correlation between the one or more transmit signals and the desired receive signal.

20. The method of claim 15, further comprising dynamically tuning the complex weight value for maximum isolation between transmit antennas of the transceiver and a receive antenna of the receiver.

21. The method of claim 20, further comprising monitoring the isolation between the transmit antennas and the receive antenna via monitoring the cross-correlation between the one or more transmit signals and the desired receive signal.

22. The method of claim 21, further comprising comparing the cross-correlation to a past cross-correlation and to a threshold cross-correlation to determine whether to update the cross-correlation value.

23. The method of claim 22, further comprising updating the cross-correlation value when the cross-correlation is greater than the past cross-correlation and the cross-correlation is greater than the threshold cross-correlation.

24. The method of claim 15, further comprising suppressing leakage of a transmit signal of the transceiver based on a first radio standard to a receive path of the transceiver based on a second, different radio standard via generating a cancellation signal based on a minimum cross-correlation between the transmit signal of the first radio standard and a desired receive signal of the second radio standard.

25. The method of claim 15, further comprising providing noise cancellation of a high frequency noise from an on-board source of the transceiver to a receive path of the transceiver via minimizing a cross-correlation between the high frequency noise and the receive path using an optimization process based on an objective function comprising the cross-correlation between the high frequency noise and a desired receive signal of the receive path.

* * * * *

UNITED STATES PATENT AND TRADEMARK OFFICE
CERTIFICATE OF CORRECTION

PATENT NO. : 9,781,612 B2
APPLICATION NO. : 14/231679
DATED : October 3, 2017
INVENTOR(S) : Buskgaard et al.

Page 1 of 1

It is certified that error appears in the above-identified patent and that said Letters Patent is hereby corrected as shown below:

In the Claims

In Column 12, Line 55, in Claim 6, delete "ora" and insert --or a-- therefor

Signed and Sealed this
Eighteenth Day of June, 2019

Andrei Iancu
*Director of the United States Patent and Trademark Office*